United States Patent
Chen et al.

(10) Patent No.: US 7,390,889 B1
(45) Date of Patent: Jun. 24, 2008

(54) TRISAZO REACTIVE DYESTUFF COMPOUND

(75) Inventors: Wen-Jang Chen, Taoyuan Hsien (TW); Chen-Lung Kao, Taoyuan Hsien (TW)

(73) Assignee: Everlight USA, Inc., Pineville, NC (US)

( * ) Notice: Subject to any disclaimer, the term of this patent is extended or adjusted under 35 U.S.C. 154(b) by 0 days.

(21) Appl. No.: 11/905,867

(22) Filed: Oct. 5, 2007

(30) Foreign Application Priority Data

Jun. 6, 2007 (CN) .......................... 2007 1 0110651

(51) Int. Cl.
*C09B 62/01* (2006.01)
*C09B 62/513* (2006.01)
*C09B 62/475* (2006.01)

(52) U.S. Cl. ...................................... 534/612; 534/642
(58) Field of Classification Search .................... None
See application file for complete search history.

(56) References Cited

U.S. PATENT DOCUMENTS 6,160,101 A  12/2000  Tzikas et al. ............... 534/634

FOREIGN PATENT DOCUMENTS

CN  1730565  2/2006

*Primary Examiner*—Fiona T Powers
(74) *Attorney, Agent, or Firm*—Bacon & Thomas, PLLC.

(57) ABSTRACT

The present invention relates to a novel trisazo reactive dyestuff compound of the following formula (I):

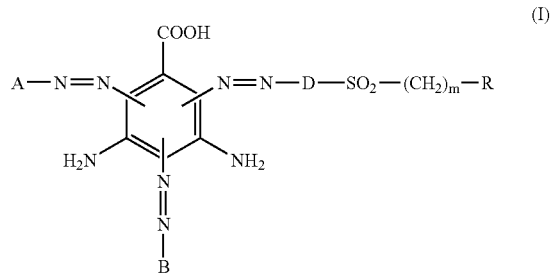

wherein, R, A, B, D, and m are defined the same as in the specification. The trisazo reactive dyestuff compound of the present invention exhibits the properties of good solubility, good alkali-resistant solubility, and good wash-off, while dyeing cellulose fibers.

23 Claims, No Drawings

TRISAZO REACTIVE DYESTUFF COMPOUND

BACKGROUND OF THE INVENTION

1. Field of the Invention

The present invention relates to a novel compound, and more particularly, relates to a novel trisazo orange reactive dyestuff compound.

2. Description of the Related Art

Nowadays, the development of reactive dyestuffs goes toward the economical demand of high fixation, good build up and good wash-off so that not only the new reactive dyestuffs, in its properties, contain sufficient substantivity to improve the fixation, but also the unfixed parts of the dyestuffs need good wash-off property.

For a polyazo orange reactive dyestuff with properties of high color yields and high fixation, the trisazo reactive dyestuff compound of the following formula (A) disclosed in U.S. Pat. No. 6,160,101 and that of the following formula (B) disclosed in China patent No. 1730565 have more than one reactive group resulting in higher fixation.

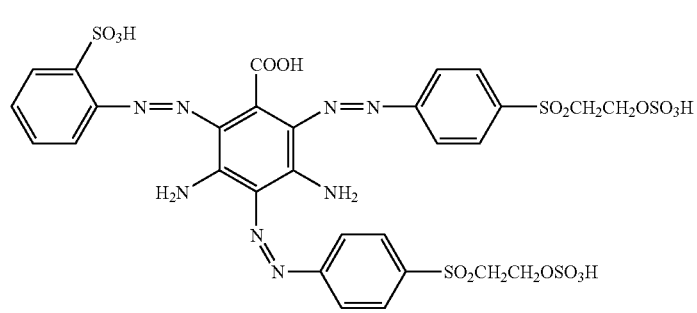

(A)

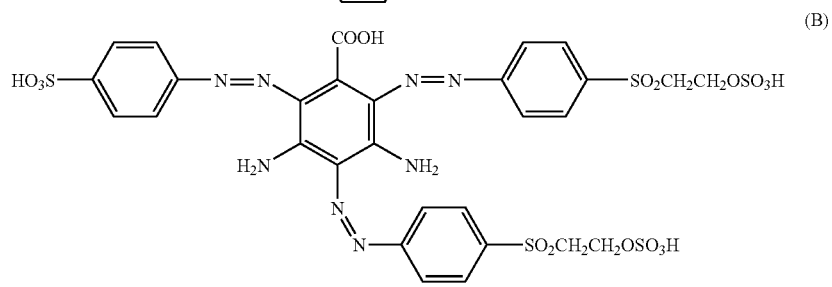

(B)

By various experiments, the present inventor develops a dyestuff which exhibits the properties of high color value, high fixation, stable binding between the fibers and the dyestuffs, excellent wet fastness, light fastness and wet fastness.

SUMMARY OF THE INVENTION

The present invention provides a novel trisazo reactive dyestuff compound which exhibits the properties of good solubility, good alkali-resistant solubility, and good wash-off, while dyeing cellulose fibers, and can be employed in exhaustion dyeing, cold-pad-batch dyeing, continuous dyeing, and digital printing.

The novel trisazo reactive dyestuff of the present invention is shown as the following formula (I),

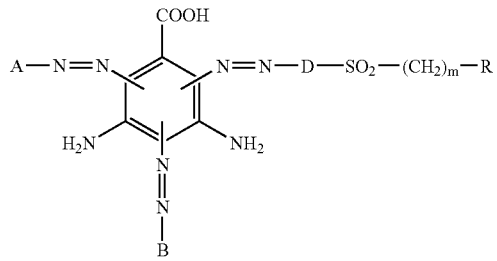

(I)

wherein

R is —OH, —NR$_2$R$_3$,

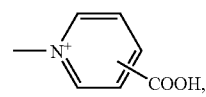

or

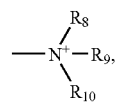

wherein R$_2$ and R$_3$ each independently are selected from the group consisting of hydrogen, C$_{1-4}$ alkyl unsubstituted or substituted by at least one group selected from the group consisting of hydroxyl, carboxyl, sulfo, and $C_{2-6}$ alkoxycarbonyl, and phenyl unsubstituted or substituted by at least one group selected from the group consisting of hydroxyl, carboxyl, sulfo, and $C_{2-6}$ alkoxycarbonyl;

$R_8$, $R_9$, and $R_{10}$ each independently are $C_{1-4}$ alkyl;

D is the group as the following formula (D-a),

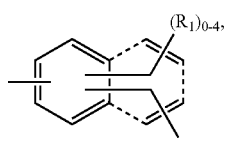

(D-a)

wherein, $(R_1)_{0-4}$ is 0, 1, 2, 3, or 4 $R_1$ groups, and each $R_1$ independently is identical or different and selected from the group consisting of halogen, hydroxyl, carboxyl, sulfo, $C_{1-4}$ alkyl, $C_{1-4}$ alkoxy, and $C_{2-6}$ alkoxycarbonyl; A and B each independently are the group as the following formula (D-b), (D-b)

Wherein, $(R_1)_{0-4}$ is defined as above;

Q is selected from the group consisting of —NH—CO—CHX—CH$_2$—X, —NH—CO—CX=CH$_2$, —CONH(CH$_2$)$_n$—SO$_2$—Y, and —SO$_2$—Y, wherein, X is halogen; Y is —CH=CH$_2$ or —CH$_2$CH$_2$U; and U is a leaving group which is eliminable by a base; and m and n are integers independent of one another between 2 to 3.

In the trisazo reactive dyestuff compound of the formula (I) of the present invention, preferably, $(R_1)_{0-4}$ is 0, 1, 2, 3, or 4 $R_1$ groups, and each $R_1$ independently is identical or different and selected from the group consisting of sulfo, methyl, and methoxy.

In the trisazo reactive dyestuff compound of the formula (I) of the present invention, preferably, Q is —SO$_2$—Y, Y is —CH=CH$_2$ or —CH$_2$CH$_2$U; and U is a leaving group which is eliminable by a base. Preferably, U is Cl or —SO$_3$H.

More preferably, the trisazo reactive dyestuff compound of the formula (I) of the present invention is the compound of the following formula (Ia),

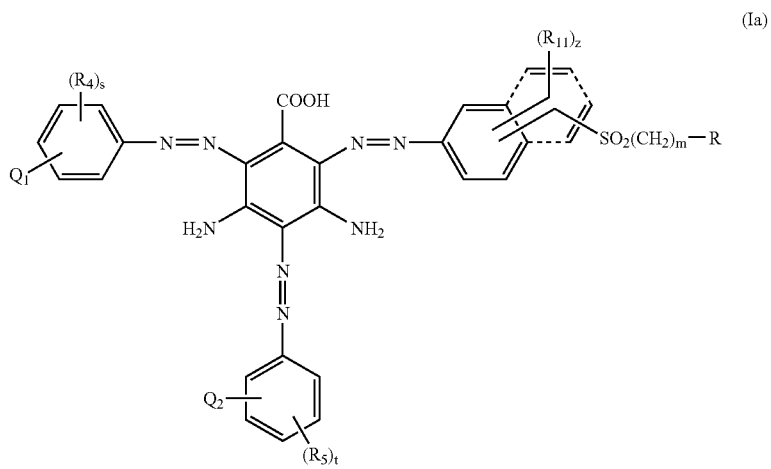

(Ia)

Wherein $Q_1$ and $Q_2$ each independently are selected from the group consisting of —NH—CO—CHX—CH$_2$—X, —NH—CO—CX=CH$_2$, —CONH(CH$_2$)$_n$—SO$_2$—Y, and —SO$_2$—Y, wherein Y is —CH=CH$_2$ or —CH$_2$CH$_2$U; U is a leaving group which is eliminable by a base; and X is halogen;

$R_4$, $R_5$, and $R_{11}$ each independently are selected from the group consisting of halogen, hydroxyl, carboxyl, sulfo, $C_{1-4}$ alkyl, $C_{1-4}$ alkoxy, and $C_{2-6}$ alkoxycarbonyl;

s, t and z are integers independent of one another between 0 to 2; and

R, m and n are defined as above.

Specific examples of the reactive dyestuff compound according to the present invention are shown as the following formulas (1) to (15), but not limited thereto.

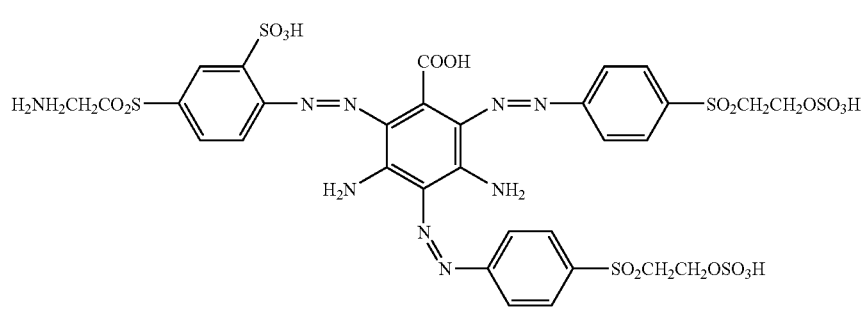
(1)
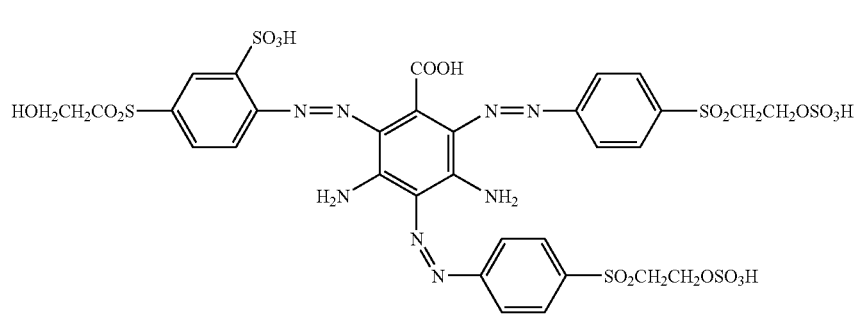
(2)
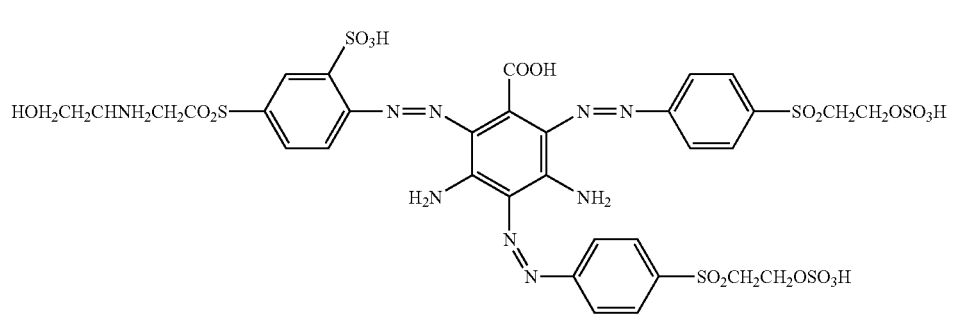
(3)
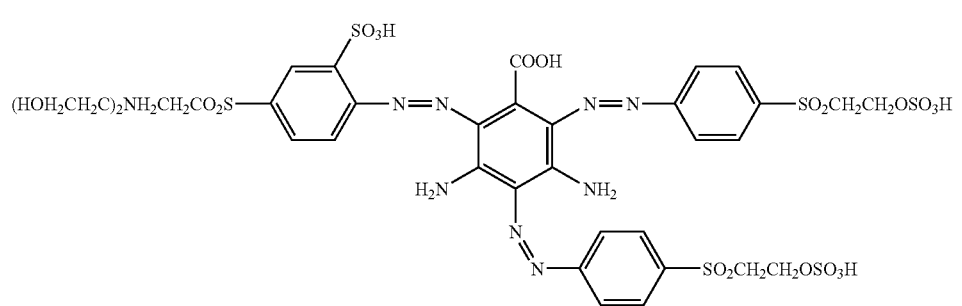
(4)
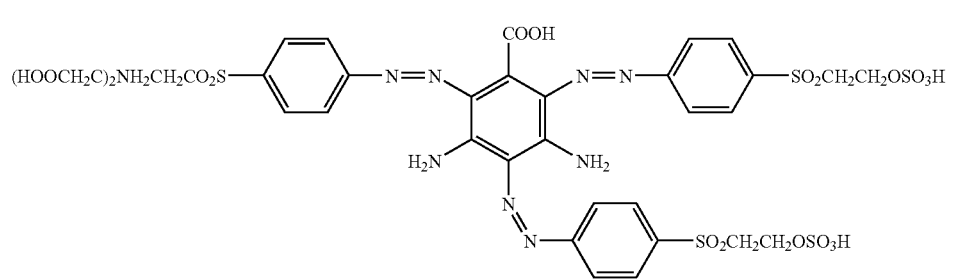
(5)

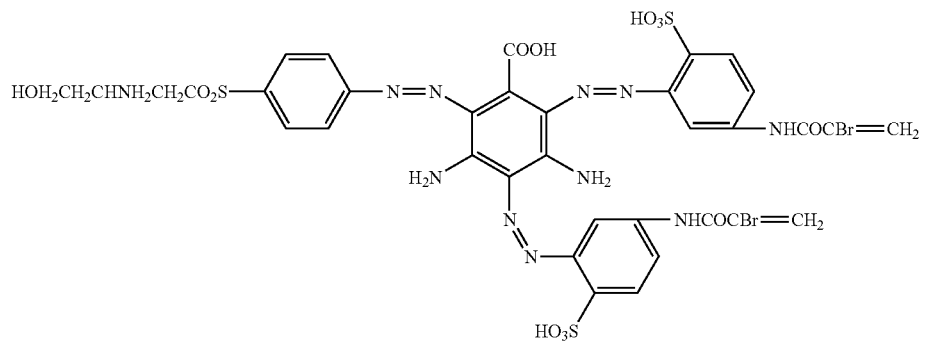
(6)
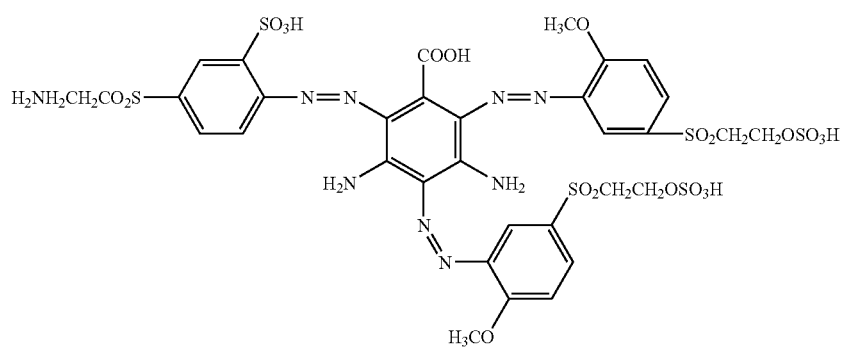
(7)
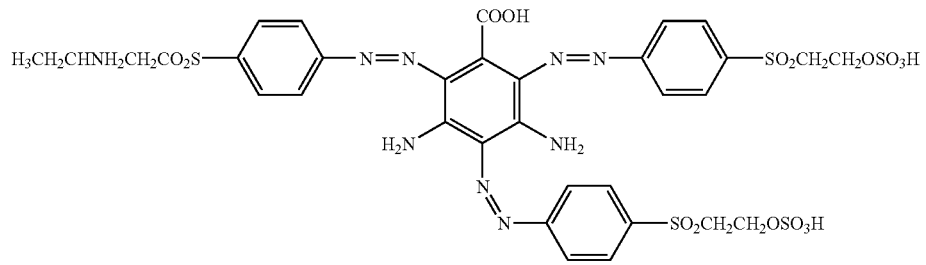
(8)
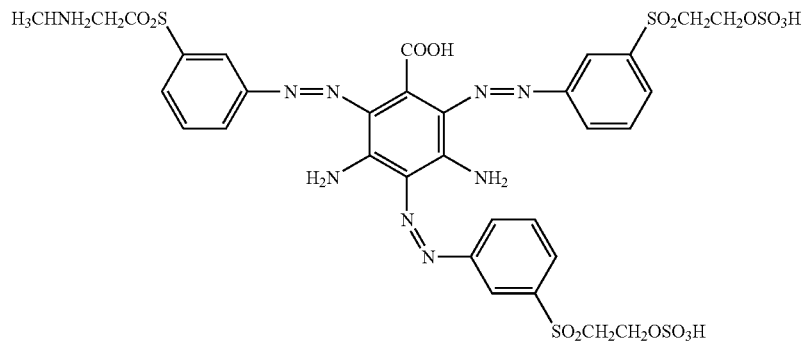
(9)
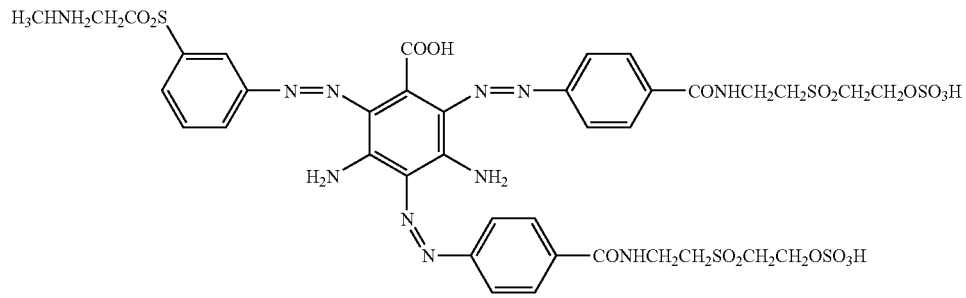
(10)

-continued
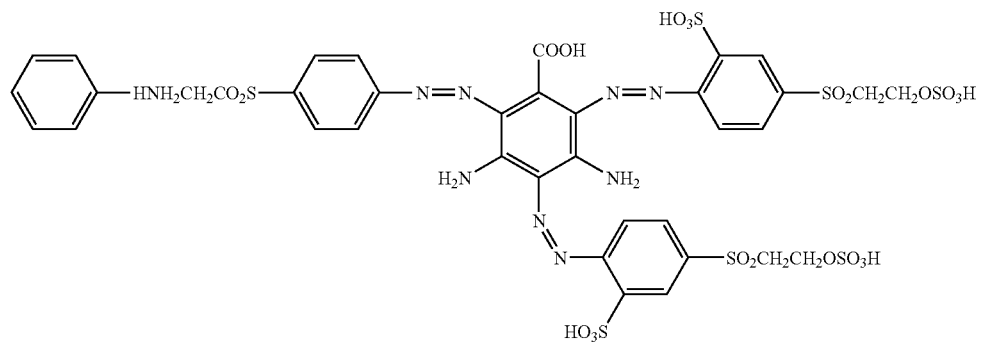
(11)
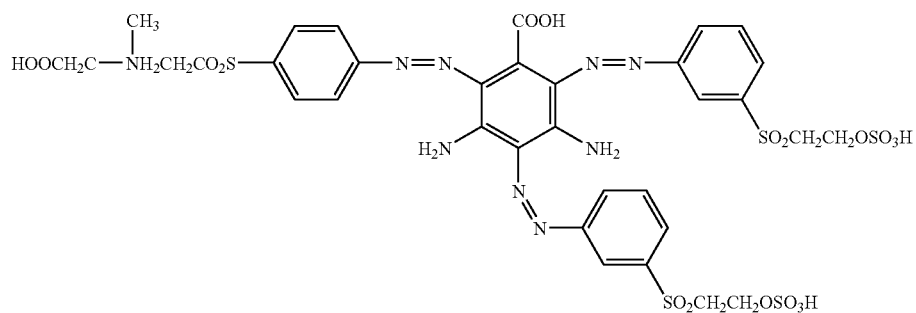
(12)
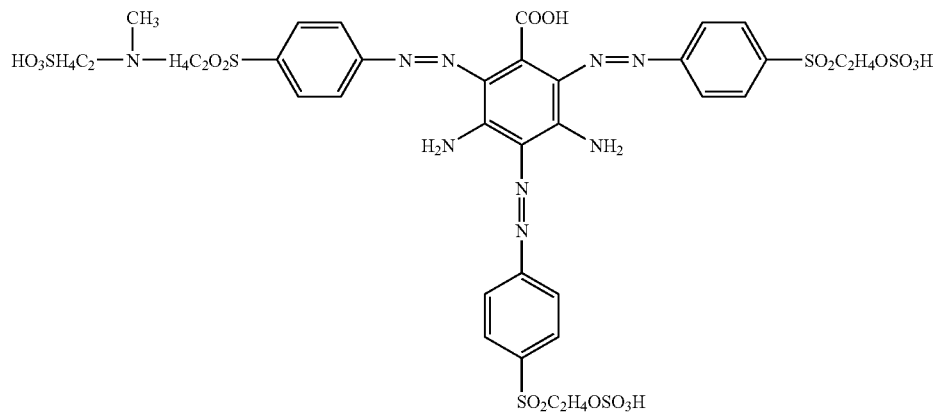
(13)
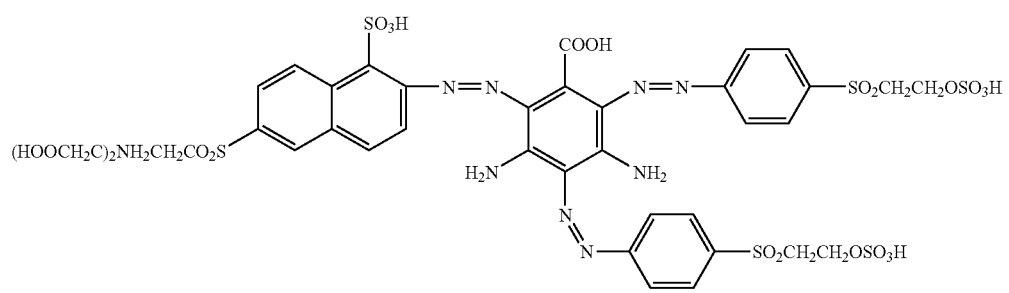
(14)

-continued (15)

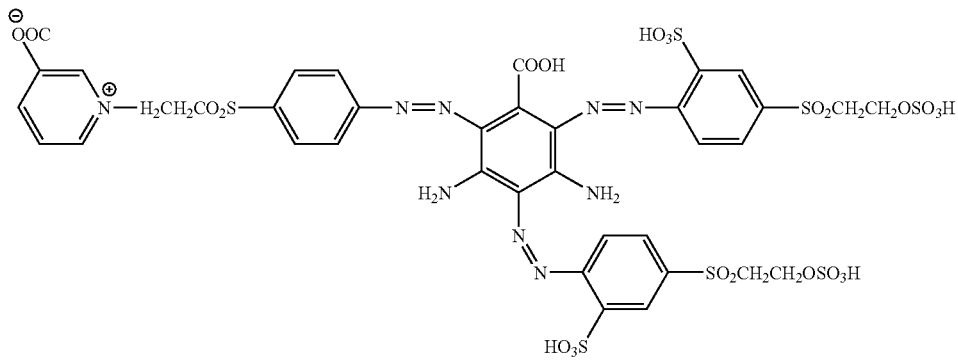

The reactive dyestuff compound of the present invention may be prepared by conventional methods, of which diazotization, coupling and condensation reaction are usually used in the field and can be accomplished by one skilled in the art. For describing conveniently, the compound is expressed as free acid in the specification. When produced or used, the reactive dyestuffs of the present invention are often presented as water-soluble salts. The salts suitable for the present invention may be the alkaline metal salts, alkaline earth metal salts, ammonium salts or organic amine salts; preferably, the salts are sodium salts, potassium salts, lithium salts, ammonium salts or triethanolamine salts.

The dyestuff of the present invention can be applied to dye and print on many kinds of fiber materials, particularly cellulose fiber materials and cellulose-included fiber materials. The examples of the fiber materials are not limited. It can be natural or regenerated cellulose fibers, such as cotton, hemp, linen, jute, ramie, mucilage rayon, as well as cellulose-included fiber materials. The dyestuff of the present invention can also be applied to dye and print fiber blended fabrics containing hydroxyl groups.

The dyestuff of the present invention can be applied to the fiber material and fixed on the fiber in various ways, in particularly in the form of aqueous dyestuff solutions and printing pastes. They can be applied to cellulose fibers by general dyeing methods, such as exhaustion dyeing, continuous dyeing, cold-pad-batch dyeing, printing or digital printing. Preferably, they are applied to cellulose fibers by exhaustion dyeing or continuous dyeing.

The dyeing or printing of the present invention can be proceeded by the conventional and usually known method. For example, exhaustion dyeing is applied by using separately or mixing the well-known inorganic salts (e.g. sodium sulfate and sodium chloride) and acid-binding agents (e.g. sodium carbonate, sodium hydroxide). The amount of inorganic salts and alkali does not matter. The inorganic salts and alkali can be added either once or several times into the dyeing bath through traditional methods. In addition, dyeing assistant agents (such as leveling agent, suspending agent and so on) can be added according to conventional method. The range of dyeing temperature is from 40° C. to 90° C. Preferably, the temperature for dyeing is from 40° C. to 70° C.

In the cold-pad-batch dyeing method, the material is padded by using the well-known inorganic salts (e.g. sodium sulfate and sodium chloride) and acid-binding agents (e.g. sodium carbonate, sodium hydroxide). The padded fabric is rolled and stored at room temperature to allow dye fixation to take place.

In the continuous dyeing method, two different methods exist. In the one-bath pad dyeing method, the material is padded according to the conventional method in the mixture of the well-known acid-binding agents (e.g. sodium carbonate or sodium bicarbonate) and the pad liquid. The resultant material is then dried and color fixed by baking or steaming.

In the two-bath pad dyeing method, the material is padded with a dye liquid and then dealt by a known inorganic neutral salt (e.g., sodium sulfate or sodium silicate). The dealt material is preferably dried and color fixed by baking or steaming as usual.

In the textile printing method, such as single printing method, the material is printed by printing slurry containing the known acid-binding agent (e.g., sodium bicarbonate) and is dried and color fixed by baking or steaming.

In the two-phase printing method, the material is dipped in a solution containing inorganic neutral salt (e.g., sodium chloride) and the known acid-binding agent (e.g., sodium hydroxide or sodium carbonate) in a high temperature of 90° C. or above to fix the color.

The dyeing or printing methods employed in the process of the present invention are not limited to the above methods.

The dyestuff of the present invention is a valuable reactive dyestuff for cellulose fibers in the present dyeing industry. The dyestuff has properties of excellent fixing capacity, outstanding build up and high wash-off and is suitable for exhaustion dyeing, cold-pad-batch dyeing, continuous dyeing, printing, and digital printing. The dyestuff of the present invention can react with the hydroxyl groups of cellulose fibers, resulting in covalent bonding, and is suitable for various cellulose fibers concluding natural, regenerated, or blend cellulose fibers, such as cotton, linen, rayon, cotton/nylon blending, and cotton/polyester blending, as well as cellulose-included fiber materials. Dyed products with various fine dyeing properties can be obtained; particularly dyeing, printing or batch-up dyeing products with high quality can be obtained in respect of build up and wash fastness.

DETAILED DESCRIPTION OF THE PREFERRED EMBODIMENT

The reactive dyestuff compound of formula (Ia) of the present invention can be prepared by the following process.

Preferably, the reactive dyestuff compound of formula (Ia) is synthesized by reacting the following compounds (a), (b), and (c) together in the molar ratio of 1:1:2,

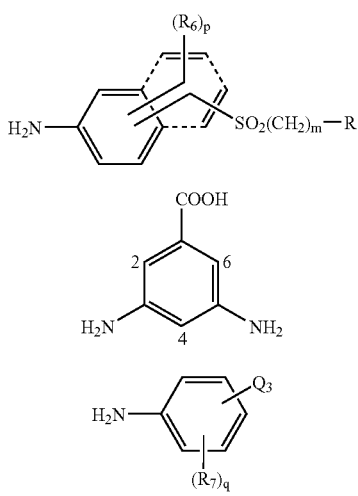

Wherein $R_6$ and $R_7$ each independently are selected from the group consisting of halogen, hydroxyl, carboxyl, sulfo, $C_{1-4}$ alkyl, $C_{1-4}$ alkoxy, and $C_{2-6}$ alkoxycarbonyl;

p and q are integers independent of one another between 0 to 2;

$Q_3$ is selected from the group consisting of —NH—CO—CHX—CH$_2$—X, —NH—CO—CX=CH$_2$, —CONH(CH$_2$)$_n$—SO$_2$—Y, and —SO$_2$—Y, wherein Y is —CH=CH$_2$ or —CH$_2$CH$_2$U; U a leaving group which is eliminable by a base; and X is halogen; and R, m and n are defined as above.

The diazotizing salt compounds of (a) and (c) are synthesized by common method, which is generally proceeded in a nitrite acidic solution at low-temperature.

In the coupling reaction between the diazotizing salt compounds and the (b) compound, the first diazotizing salt is generally coupling on the 2-position of the phenyl group in the (b) compound while the second and third diazotizing salts are coupling on the 4-position and 6-position of the phenyl group in the (b) compound, respectively. The ideal condition for the coupling reaction is in a condition of pH 2~7 at normal temperature, and preferably, is pH 3~7 at a temperature in the range of 5~25° C.

Hereinafter, the present invention will be further explained. However, it is to be understood that the examples below are only for illustrated, but not to limit the scope of the present invention. The compounds are represented in the form of free acid. However, in practice, they often exist as metallic salts, and most likely alkaline metallic salts, particularly sodium salts. Unless otherwise stated, the parts and percentage used in the following examples are based on weight, and the temperature is in Celsius degree (° C.).

Example 1

28 parts of 2-sulfonic-4-β-sulfatoethylamino-aniline are dispersed in 300 parts of ice water, and then 22.8 parts of 32% HCl are added therein with thorough stirring, followed by the addition of 6.9 parts of sodium nitrite with continuous stirring at a temperature in the range of 0° C. to 5° C. until the diazotization is accomplished.

15.2 parts of 3,5-diaminobenzoic acid are added to an aqueous solution (100 ml) containing 22.8 parts of 32% HCl with stirring for 30 minutes at a temperature in the range of 0° C. to 5° C., followed by the addition of the diazotizing compound afforded by the aforementioned process with continuous stirring until the coupling reaction is accomplished.

56.2 parts of 4-β-sulfatoethylsulfone-aniline are dispersed in 580 parts of ice water, and then 45.6 parts of 32% HCl aqueous solution are added therein with thorough stirring, followed by the addition of 13.8 parts of sodium nitrite aqueous solution with continuous stirring at a temperature in the range of 0° C. to 5° C. until the diazotization is accomplished. The coupling compound afforded by the aforementioned process is added therein, and the pH value of the reaction solution is adjusted to 6.5 by NaHCO$_3$ with continuous stirring at a temperature in the range of 15° C. to 25° C. until the coupling reaction is accomplished. The orange product of the following formula (1) is obtained by salting-out, filtration and wash with brine water.

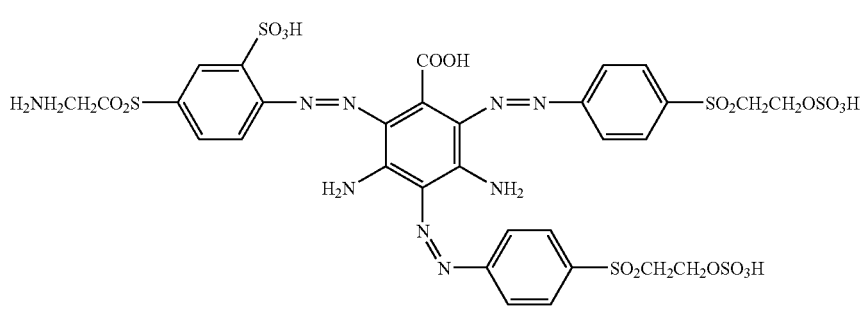

(1)

Example 2

28.1 parts of 2-sulfonic-4-β-sulfatoethylhydroxy-aniline are dispersed in 300 parts of ice water, and then 22.8 parts of 32% HCl are added therein with thorough stirring, followed by the addition of 6.9 parts of sodium nitrite with continuous stirring at a temperature in the range of 0° C. to 5° C. until the diazotization is accomplished.

15.2 parts of 3,5-diaminobenzoic acid are added to an aqueous solution (100 ml) containing 22.8 parts of 32% HCl with stirring for 30 minutes at a temperature in the range of 0° C. to 5° C., followed by the addition of the diazotizing compound afforded by the aforementioned process with continuous stirring until the coupling reaction is accomplished.

56.2 parts of 4-β-sulfatoethylsulfone-aniline are dispersed in 600 parts of ice water, and then 45.6 parts of 32% HCl aqueous solution are added therein with thorough stirring, followed by the addition of 13.8 parts of sodium nitrite aqueous solution with continuous stirring at a temperature in the range of 0° C. to 5° C. until the diazotization is accomplished. The coupling compound afforded by the aforementioned process is added therein, and the pH value of the reaction solution is adjusted to 6.5 by NaHCO$_3$ with continuous stirring at a temperature in the range of 15° C. to 25° C. until the coupling reaction is accomplished. The orange product of the following formula (2) is obtained by salting-out, filtration and wash with brine water.

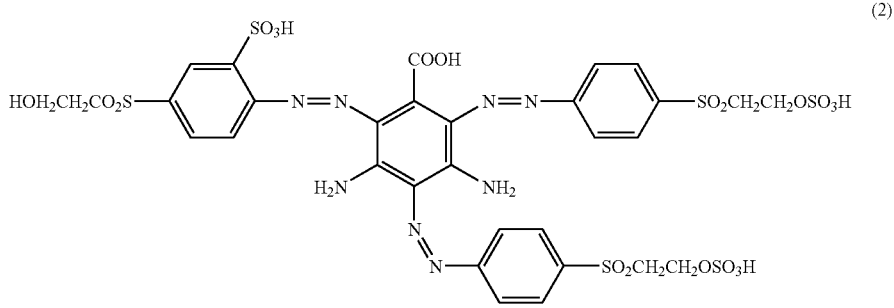

(2)

Example 3-15

According to the synthetic methods of Examples 1 and 2, the dyestuff compounds of the following examples 3-15 are obtained. In Table 1, the color appearance is the color of the dyestuff compound dissolved in water.

TABLE 1

| Example | Structure | | color appearance |
|---|---|---|---|
| 3 | (structure shown) | (3) | orange |
| 4 | (structure shown) | (4) | orange |

TABLE 1-continued

| Example | Structure | | color appearance |
|---|---|---|---|
| 5 | (HOOCH$_2$C)$_2$NHCH$_2$CO$_2$S—C$_6$H$_4$—N=N—[C$_6$H(COOH)(NH$_2$)$_2$]—N=N—C$_6$H$_4$—SO$_2$CH$_2$CH$_2$OSO$_3$H, with additional —N=N—C$_6$H$_4$—SO$_2$CH$_2$CH$_2$OSO$_3$H substituent | (5) | orange |
| 6 | HOH$_2$CH$_2$CHNHCH$_2$CO$_2$S—C$_6$H$_4$—N=N—[C$_6$H(COOH)(NH$_2$)$_2$]—N=N—C$_6$H$_3$(SO$_3$H)—NHCOCBr=CH$_2$, with additional —N=N—C$_6$H$_3$(SO$_3$H)—NHCOCBr=CH$_2$ substituent | (6) | orange |
| 7 | H$_2$NH$_2$CH$_2$CO$_2$S—C$_6$H$_3$(SO$_3$H)—N=N—[C$_6$H(COOH)(NH$_2$)$_2$]—N=N—C$_6$H$_3$(OCH$_3$)—SO$_2$CH$_2$CH$_2$OSO$_3$H, with additional —N=N—C$_6$H$_3$(OCH$_3$)—SO$_2$CH$_2$CH$_2$OSO$_3$H substituent | (7) | orange |
| 8 | H$_3$CH$_2$CHNHCH$_2$CO$_2$S—C$_6$H$_4$—N=N—[C$_6$H(COOH)(NH$_2$)$_2$]—N=N—C$_6$H$_4$—SO$_2$CH$_2$CH$_2$OSO$_3$H, with additional —N=N—C$_6$H$_4$—SO$_2$CH$_2$CH$_2$OSO$_3$H substituent | (8) | orange |

TABLE 1-continued

| Example | Structure | | color appearance |
|---|---|---|---|
| 9 | [structure (9)] | (9) | orange |
| 10 | [structure (10)] | (10) | orange |
| 11 | [structure (11)] | (11) | orange |
| 12 | [structure (12)] | (12) | orange |

TABLE 1-continued

| Example | Structure | | color appearance |
|---|---|---|---|
| 13 | [chemical structure] | (13) | orange |
| 14 | [chemical structure] | (14) | orange |
| 15 | [chemical structure] | (15) | orange |

Testing Example 1

1 part of the dyestuff compound prepared in Example 1 is dissolved in 100 parts of distilled water to prepare a stock solution. 20 parts of the dye solution are poured into a dyeing vessel. 4.8 parts of Glauber's Salt are added to the dyeing vessel and then distilled water is poured therein to make up the total amount of the dyeing solution in the dyeing vessel to be 75 parts in total. After that, 5 parts of 320 g/l soda ash are added to the dyeing vessel. 4 parts of pre-wet woven cotton fabric are put into the dyeing solution, followed by covering and locking the dyeing vessel, and shaking the dyeing vessel to survey the dye. Then, the dyeing vessel is put into a thermostatic bath, followed by switching on the rotating knob. The temperature is raised to 60° C. in 30 minutes and then the temperature is kept for 60 minutes for fixation. After dyeing, the dyed fabric is washed with cold water, followed by washing, dehydrating them and drying. Finally, an orange fabric with good build up and good tinctorial yield is obtained.

Testing Example 2

3 parts of the dyestuff compound prepared in Example 2 are dissolved in 100 mL of water to obtain a 20 parts/l padding liquor. 25 ml of alkali solvent (taking 15 ml/l of NaOH and 30 parts/l of Glauber's salt) is added to the padding liquor and stirred thoroughly. The resultant solution is then put into a pad roller machine. The cotton fabric is padded by the roller pad machine, and batched for 4 hours under room temperature. The obtained orange fabric is orderly washed with cold water, boiling water for 10 minutes, boiling non-ionic detergent for 10 minutes, again with cold water and then dried to obtain an orange fabric with good build up and good tinctorial yield.

Testing Example 3

100 parts of Urea, 10 parts of m-nitrobenzene sulfonic acid sodium salt, 20 parts of sodium bicarbonate, 55 parts of sodium alginate, and 815 parts of lukewarm water (1000 parts in total) are stirred in a vessel to obtain a completely homogeneous printing paste.

3 parts of the dyestuff prepared in Example 3 are sprayed in 100 parts of the above printing paste and stirred to make a homogeneous colored paste. An adequate size piece of twilled cotton fabric is covered with a 100 mesh 45'-twilled printing screen and then painted with the colored paste on the printing screen to give a colored fabric.

This colored fabric is placed in an oven at 65° C. for 5 minutes until dry and then put into a steaming oven using saturated steam of 102~105° C. for 10 minutes.

The obtained orange fabric is orderly washed with cold water, boiling water for 10 minutes, boiling non-ionic detergent for 10 minutes, again with cold water and then dried to obtain an orange fabric with good build up and good tinctorial yield.

From the foregoing description, the technology according to the present invention achieves the objects of the invention and conforms to the patent requirements of novelty, inventive step and industrial applicability. Although the present invention has been explained in relation to its preferred examples, it is to be understood that many other possible modifications and variations can be made without departing from the scope of the invention as hereinafter claimed.

What is claimed is:

1. A trisazo reactive dyestuff compound of the following formula (I),

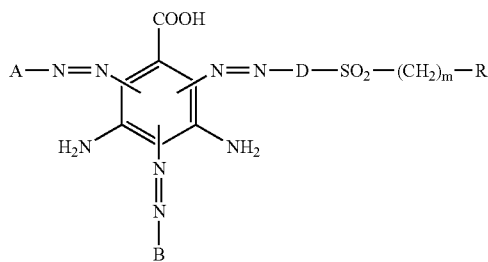

wherein
R is —OH, —NR$_2$R$_3$,

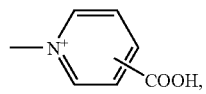

or

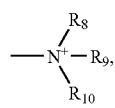

wherein R$_2$ and R$_3$ each independently are selected from the group consisting of hydrogen, C$_{1-4}$ alkyl unsubstituted or substituted by at least one group selected from the group consisting of hydroxyl, carboxyl, sulfo, and C$_{2-6}$ alkoxycarbonyl, and phenyl unsubstituted or substituted by at least one group selected from the group consisting of hydroxyl, carboxyl, sulfo, and C$_{2-6}$ alkoxycarbonyl;

R$_8$, R$_9$, and R$_{10}$ each independently are C$_{1-4}$ alkyl;

D is the group of the following formula (D-a),

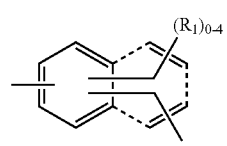

wherein, (R$_1$)$_{0-4}$ is 0, 1, 2, 3, or 4 R$_1$ groups, and each R$_1$ independently is identical or different and selected from the group consisting of halogen, hydroxyl, carboxyl, sulfo, C$_{1-4}$ alkyl, C$_{1-4}$ alkoxy, and C$_{2-6}$ alkoxycarbonyl;

A and B each independently are the group of the following formula (D-b),

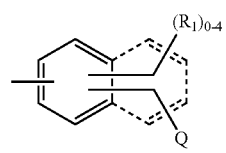

Wherein, R$_1$ is defined as above;

Q is selected from the group consisting of —NH—CO—CHX—CH$_2$—X, —NH—CO—CX=CH$_2$, —CONH(CH$_2$)$_n$—SO$_2$—Y, and —SO$_2$—Y, wherein, X is halogen; Y is —CH=CH$_2$ or —CH$_2$CH$_2$U; and U is a leaving group which is eliminable by a base; and m and n are integers independent of one another between 2 to 3.

2. The trisazo reactive dyestuff compound of claim 1, wherein Q is —SO$_2$—Y, Y is —CH=CH$_2$ or —CH$_2$CH$_2$U; and U is a leaving group which is eliminable by a base.

3. The trisazo reactive dyestuff compound of claim 2, wherein U is Cl or —SO$_3$H.

4. The trisazo reactive dyestuff compound of claim 1, wherein (R)$_{0-4}$ in the formula (D-a) is 0, 1, 2, 3, or 4 R$_1$ groups, and each R$_1$ independently is identical or different and selected from the group consisting of sulfo, methyl, and methoxy.

5. The trisazo reactive dyestuff of claim 1, wherein (R$_1$)$_{0-4}$ in the formula (D-b) is 0, 1, 2, 3, or 4 R$_1$ groups, and each R$_1$ independently is identical or different and selected from the group consisting of sulfo, methyl, and methoxy; Q is selected from the group consisting of —NH—CO—CHX—CH$_2$—X, —NH—CO—CX=CH$_2$, —CONH(CH$_2$)$_n$—SO$_2$—Y; Y is —CH=CH$_2$ or —CH$_2$CH$_2$U; and U is a leaving group which is eliminable by a base.

6. The trisazo reactive dyestuff of claim 5, wherein Q is —SO$_2$—Y, Y is —CH=CH$_2$ or —CH$_2$CH$_2$U; and U is a leaving group which is eliminable by a base.

7. The trisazo reactive dyestuff of claim 6, wherein U is Cl or —SO$_3$H.

8. The trisazo reactive dyestuff of claim 1, wherein the trisazo reactive dyestuff compound of the formula (I) is the compound of the following formula (Ia),

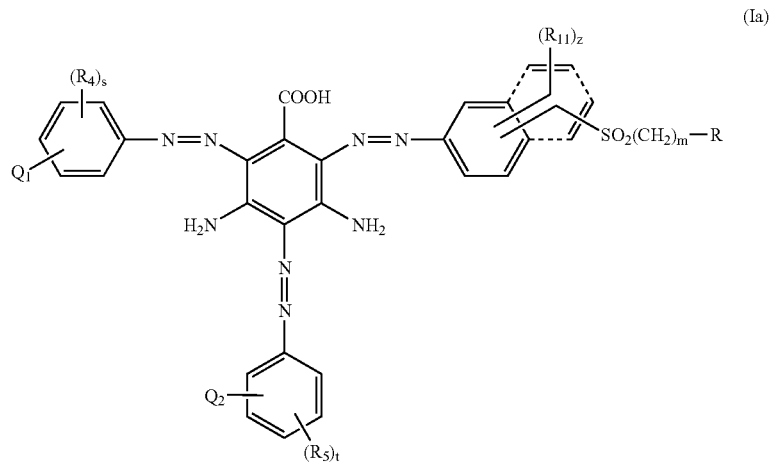

Wherein
- $Q_1$ and $Q_2$ each independently are selected from the group consisting of $-NH-CO-CHX-CH_2-X$, $-NH-CO-CX=CH_2$, $-CONH(CH_2)_n-SO_2-Y$, and $-SO_2-Y$, wherein Y is $-CH=CH_2$ or $-CH_2CH_2U$; U is a leaving group which is eliminable by a base; and X is halogen;
- $R_4$, $R_5$, and $R_{11}$ each independently are selected from the group consisting of halogen, hydroxyl, carboxyl, sulfo, $C_{1-4}$ alkyl, $C_{1-4}$ alkoxy, and $C_{2-6}$ alkoxycarbonyl;
- s, t and z are integers independent of one another between 0 to 2; and
- R, m and n are defined as claim 1.

9. The trisazo reactive dyestuff of claim 8, wherein the compound of formula (I-a) is the compound of the following formula (1),

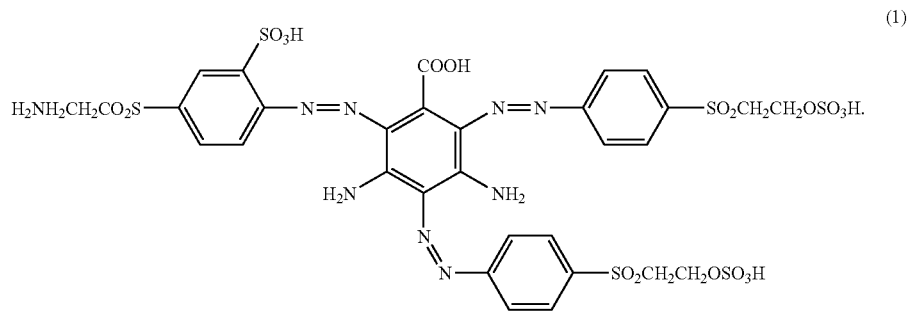

10. The trisazo reactive dyestuff of claim 8, wherein the compound of formula (I-a) is the compound of the following formula (2),

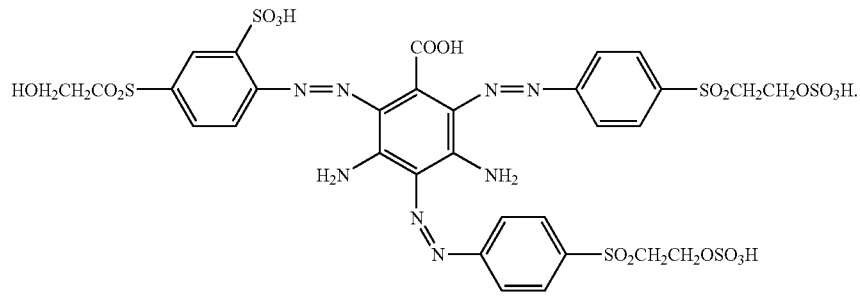
(2)
11. The trisazo reactive dyestuff of claim 8, wherein the compound of formula (I-a) is the compound of the following formula (3),
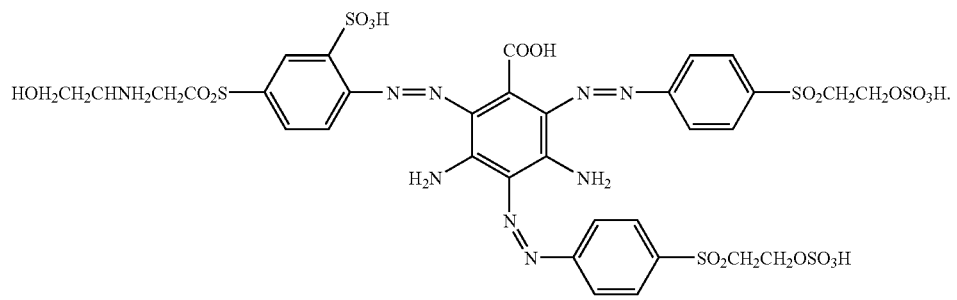
(3)
12. The trisazo reactive dyestuff of claim 8, wherein the compound of formula (I-a) is the compound of the following formula (4),
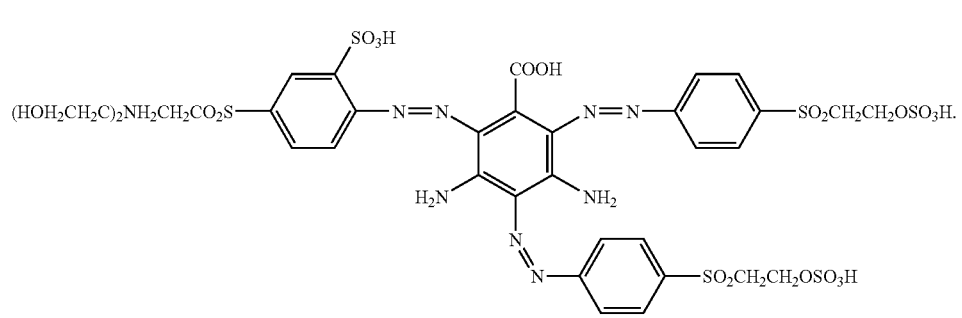
(4)
13. The trisazo reactive dyestuff of claim 8, wherein the compound of formula (I-a) is the compound of the following formula (5),

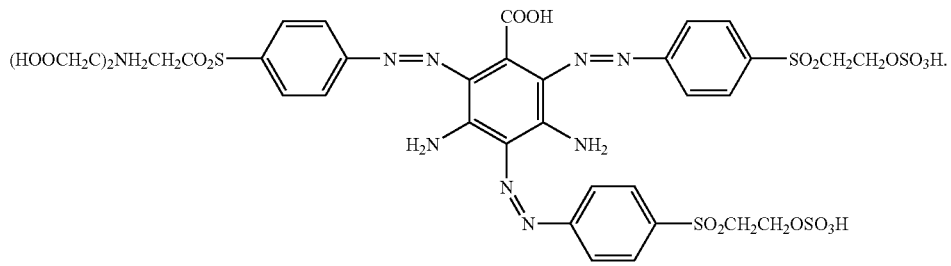
(5)
14. The trisazo reactive dyestuff of claim 8, wherein the compound of formula (I-a) is the compound of the following formula (6),
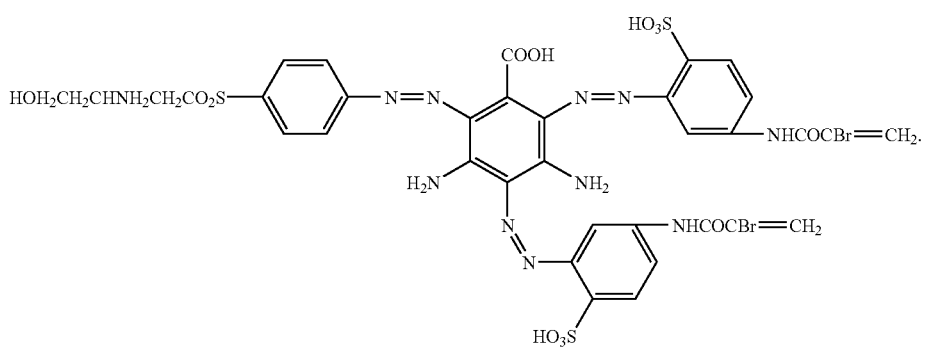
(6)
15. The trisazo reactive dyestuff of claim 8, wherein the compound of formula (I-a) is the compound of the following formula (7),
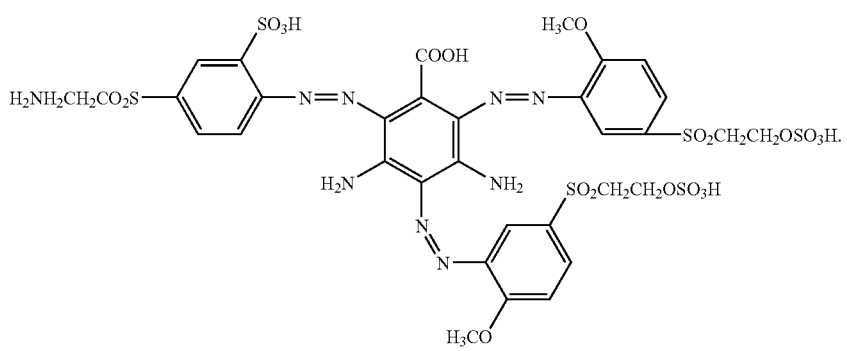
(7)
16. The trisazo reactive dyestuff of claim 8, wherein the compound of formula (I-a) is the compound of the following formula (8),

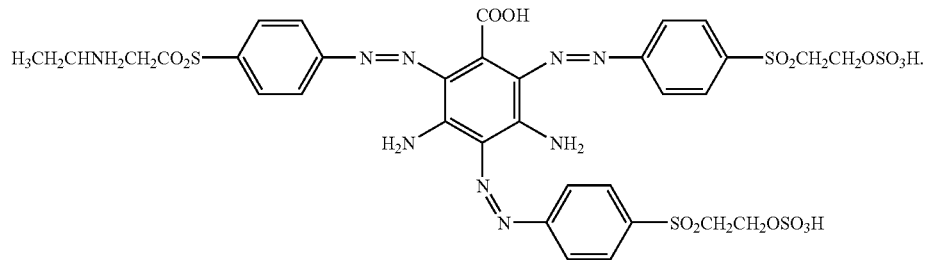
17. The trisazo reactive dyestuff of claim 8, wherein the compound of formula (I-a) is the compound of the following formula (9),
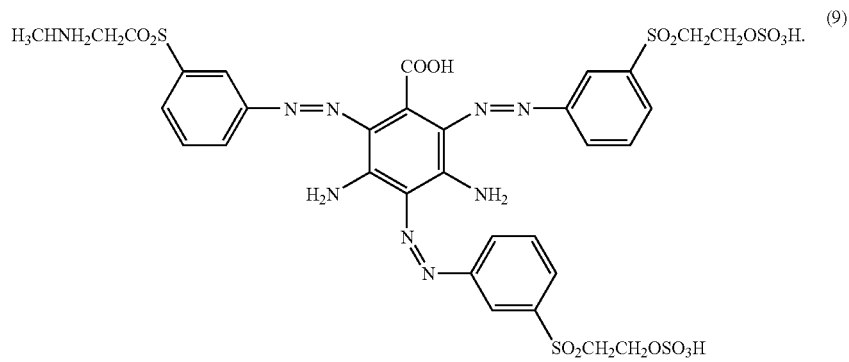
18. The trisazo reactive dyestuff of claim 8, wherein the compound of formula (I-a) is the compound of the following formula (10),
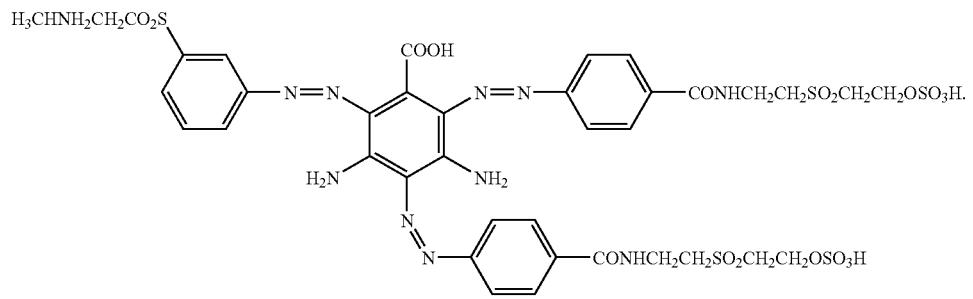
19. The trisazo reactive dyestuff of claim 8, wherein the compound of formula (I-a) is the compound of the following formula (11),

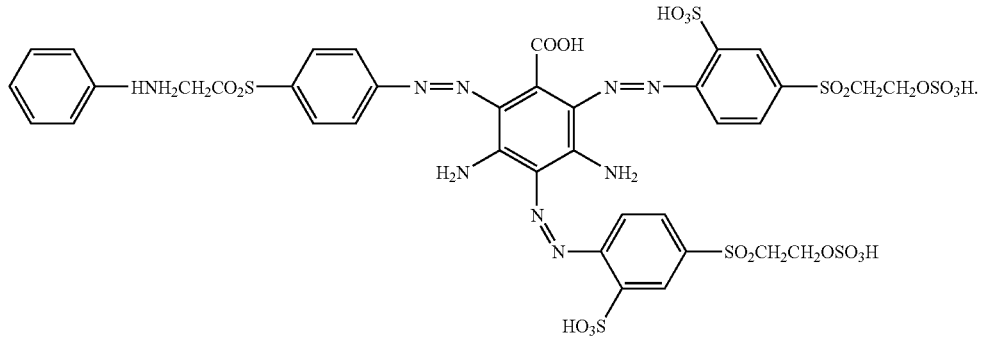
(11)
20. The trisazo reactive dyestuff of claim 8, wherein the compound of formula (I-a) is the compound of the following formula (12),
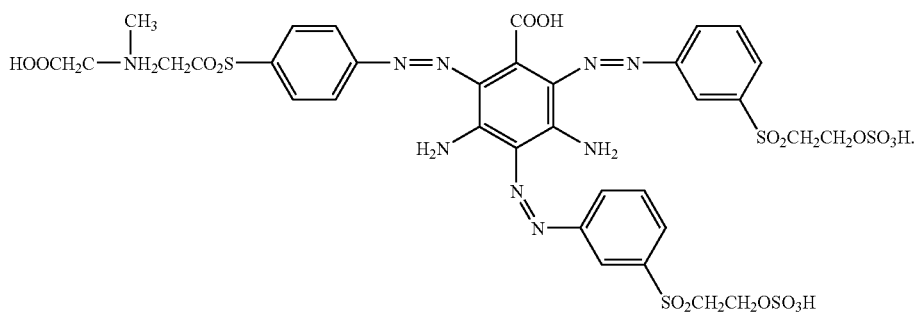
(12)
21. The trisazo reactive dyestuff of claim 8, wherein the compound of formula (I-a) is the compound of the following formula (13),
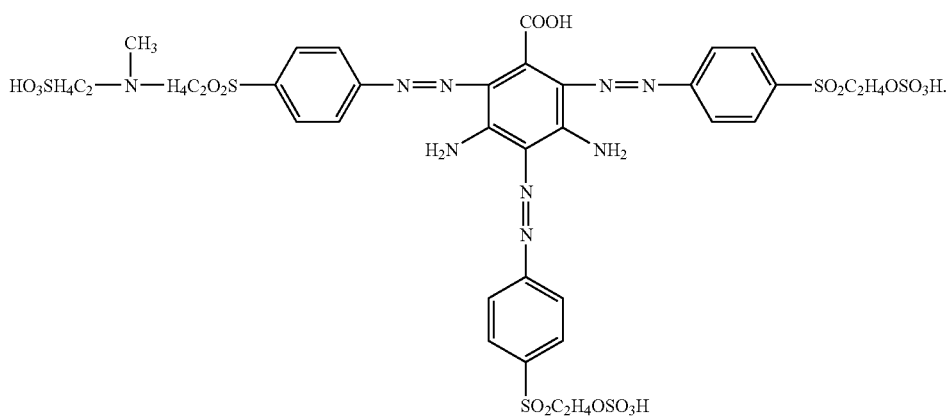
(13)
22. The trisazo reactive dyestuff of claim 8, wherein the compound of formula (I-a) is the compound of the following formula (14),

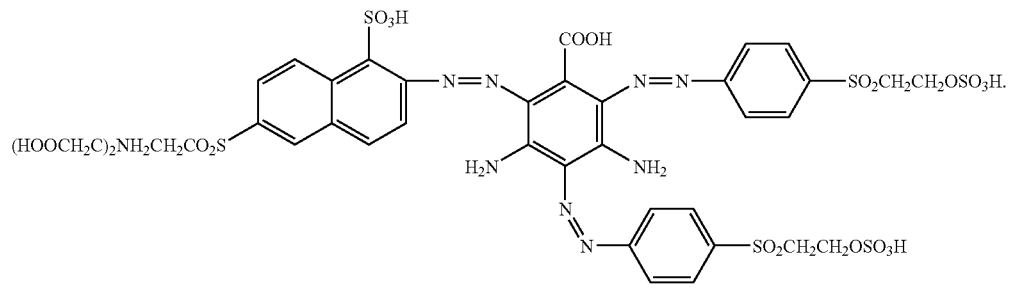
(14)
23. The triazo reactive dyestuff of claim 8, wherein the compound of formula (I-a) is the compound of the following formula (15),
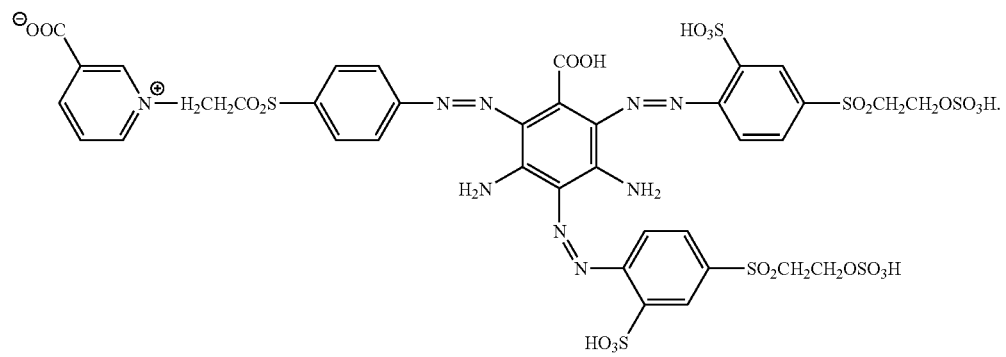
(15)
* * * * *